US012644682B2

(12) United States Patent
Murata

(10) Patent No.: US 12,644,682 B2
(45) Date of Patent: Jun. 2, 2026

(54) IGNITION DEVICE

(71) Applicant: NIPPON KAYAKU KABUSHIKI KAISHA, Tokyo (JP)

(72) Inventor: Shoma Murata, Himeji (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 18/836,244

(22) PCT Filed: Mar. 7, 2023

(86) PCT No.: PCT/JP2023/008687
§ 371 (c)(1),
(2) Date: Aug. 6, 2024

(87) PCT Pub. No.: WO2023/171689
PCT Pub. Date: Sep. 14, 2023

(65) Prior Publication Data
US 2025/0180338 A1 Jun. 5, 2025

(30) Foreign Application Priority Data
Mar. 11, 2022 (JP) ................................ 2022-038679

(51) Int. Cl.
*F42B 3/12* (2006.01)
*F42B 3/04* (2006.01)
*H01H 3/32* (2006.01)

(52) U.S. Cl.
CPC ................. *F42B 3/12* (2013.01); *F42B 3/04* (2013.01); *H01H 3/32* (2013.01)

(58) Field of Classification Search
CPC ................ F42B 3/12; F42B 3/04; H01H 3/32
USPC ...................................................... 102/202.9
See application file for complete search history.

(56) References Cited

U.S. PATENT DOCUMENTS 5,140,906 A * 8/1992 Little, II ................ F42B 3/188 102/202.5
5,454,320 A * 10/1995 Hilden .................... F42B 3/127 102/202.7
5,932,832 A * 8/1999 Hansen .............. B60R 21/2644 102/202.4

(Continued)

FOREIGN PATENT DOCUMENTS

JP 2006-138510 A 6/2006
WO WO 2017/138612 A1 8/2017

OTHER PUBLICATIONS

International Search Report issued Apr. 18, 2023, PCT/JP2023/008687, filed on Mar. 7, 2023, 2 pages.

(Continued)

*Primary Examiner* — Samir Abdosh
(74) *Attorney, Agent, or Firm* — Oblon, McClelland, Maier & Neustadt, L.L.P.

(57) ABSTRACT

An ignition device includes an igniter that accommodates an ignition charge to be ignited by energization, and a holder that includes an insertion port for inserting the igniter, and is integrated with the igniter by fitting the igniter from the insertion port and press-fitting a tube body into a press-fitting portion. An end portion of the tube body is fitted into an annular groove formed in a bore, and a labyrinth structure is formed by an inner wall portion, an end surface portion, and an outer wall portion of the end portion, and the annular groove.

20 Claims, 3 Drawing Sheets

(56) References Cited

U.S. PATENT DOCUMENTS

| | | | | |
|---|---|---|---|---|
| 2005/0115436 | A1* | 6/2005 | Renz | F42B 3/195 102/202.5 |
| 2008/0190316 | A1 | 8/2008 | Kagawa et al. | |
| 2015/0107477 | A1* | 4/2015 | Heigl | F42B 3/10 156/60 |
| 2019/0054891 | A1 | 2/2019 | Tanaka et al. | |
| 2020/0103207 | A1 | 4/2020 | Heigl et al. | |

OTHER PUBLICATIONS

Japanese Office Action issued Oct. 3, 2025, in corresponding Japanese Patent Application No. 2022-038679 (with English Translation), 6 pages.

* cited by examiner

IGNITION DEVICE

CROSS-REFERENCE TO RELATED APPLICATIONS

The present application is a 35 U.S.C. § 371 national stage application of International patent application PCT/JP2023/008687, filed Mar. 7, 2023, which is based on and claims the benefit of priority to Japanese Application No. 2022-038679, filed Mar. 11, 2022. The entire contents of these applications are incorporated herein by reference.

TECHNICAL FIELD

The present invention relates to an ignition device used for a safety device such as an automobile.

BACKGROUND ART

Conventionally, seat belt devices and airbag devices have been widely used from the viewpoint of protecting an occupant of an automobile and the like. Among them, the seat belt device is provided for the purpose of preventing the occupant from being released into a vehicle or the outside of the vehicle due to an impact generated at the time of collision of the vehicle or the like, and binds and fixes the occupant to the seat by winding the belt around the body of the occupant.

In recent years, a seat belt device having a pretensioner function has been widely used in order to improve an occupant protection function. The pretensioner function instantaneously winds up the slack of the seat belt caused by a thickness of the clothing or the like at the time of collision or immediately before collision, and enhances the effect of restraining the occupant. This pretensioner function is realized by strongly drawing a seat belt by a pressure of a gas output from a gas generator called a micro gas generator (MGG).

As an ignition device used in such a gas generator, there is an ignition device described in Patent Literature 1 below. The ignition device of the gas generator of Patent Literature 1 includes an igniter that is disposed inside a cup body and ignites a gas generating agent by energization, and a holder that seals the gas generating agent in the cup body. The holder is formed of resin and is formed integrally with the igniter by insert molding.

CITATIONS LIST

Patent Literature

Patent Literature 1: JP 2002-239371 A

SUMMARY OF INVENTION

Technical Problems

Note that the ignition device in Patent Literature 1 exhibits a sufficient function by being used in a seat belt device having a pretensioner function, but such a function may be excessive in light of the purpose or application. For example, in a case where the ignition device in Patent Literature 1 is simply used as an ignition device for a current breaker, the original capability is excessive, and a part of the manufacturing cost may be wasted.

Therefore, an object of the present invention is to provide an ignition device capable of securing a necessary function according to a purpose or an application and capable of easily performing assembly by reducing the number of parts as compared with the related art.

Solutions to Problems (1) An ignition device according to the present invention is an ignition device including: an igniter that accommodates an ignition charge to be ignited by energization; and a holder that is integrated with the igniter by fitting the igniter into the holder, in which the igniter includes: a tube body containing the ignition charge inside and including an opening; an header that occludes the opening and seals the ignition charge inside the tube body; and a pair of terminal pins provided on the header, an end portion of the tube body forming the opening is formed so as to protrude with respect to the header, the holder includes: a bore including an insertion port that is formed inside and into which the igniter is inserted and a press-fitting portion into which the tube body is press-fitted via the insertion port, the igniter being fitted into and fixed to the bore by press-fitting the tube body into the press-fitting portion via the insertion port; and an annular groove that is formed in a part of an inner wall of the bore and into which an end portion of the tube body is fitted, and a labyrinth structure is formed by at least the end portion of the tube body fitted into the annular groove and the annular groove.

In the ignition device of (1) described above, it is preferable that a surface (hereinafter, an opposite surface) of the header on a side opposite to a side on which the ignition charge is disposed is in contact with a surface that is radially inner than the annular groove and is formed on an inner wall of the bore so as to face the opposite surface.

(3) In the ignition device of (2) described above, it is preferable that a tapered shape that reduces in diameter in a direction of the press-fitting is formed halfway from the surface that is radially inner than the annular groove and is formed on the inner wall of the bore so as to face the opposite surface to a portion of the bore where the pair of terminal pins is inserted on a side opposite to a side where the tube body is press-fitted.

(4) In the ignition device of (1) to (3) described above, it is preferable that an annular weak portion is formed on an outer peripheral portion of the insertion port.

(5) In the ignition device of (1) to (4) described above, it is preferable that a tapered shape that reduces in diameter along a direction of the press-fitting is formed between the insertion port and the press-fitting portion of the bore.

(6) In the ignition device of (1) to (5) described above, it is preferable that a pair of through holes into which each of the pair of terminal pins is inserted is formed in a portion of the bore into which the pair of terminal pins is inserted on a side opposite to a side where the tube body is press-fitted.

According to the configurations (1) to (6) described above, it is possible to provide an ignition device capable of securing a necessary function according to a purpose or an application and capable of easily performing assembly by reducing the number of parts as compared with the related art.

DESCRIPTION OF EMBODIMENT

Hereinafter, an ignition device according to an embodiment of the present invention will be described with reference to the drawings. This ignition device can be used as a current breaker, for example, for burning a conductive wire through which current flows or for moving a piston to cut the conductive wire.

Figure 1:
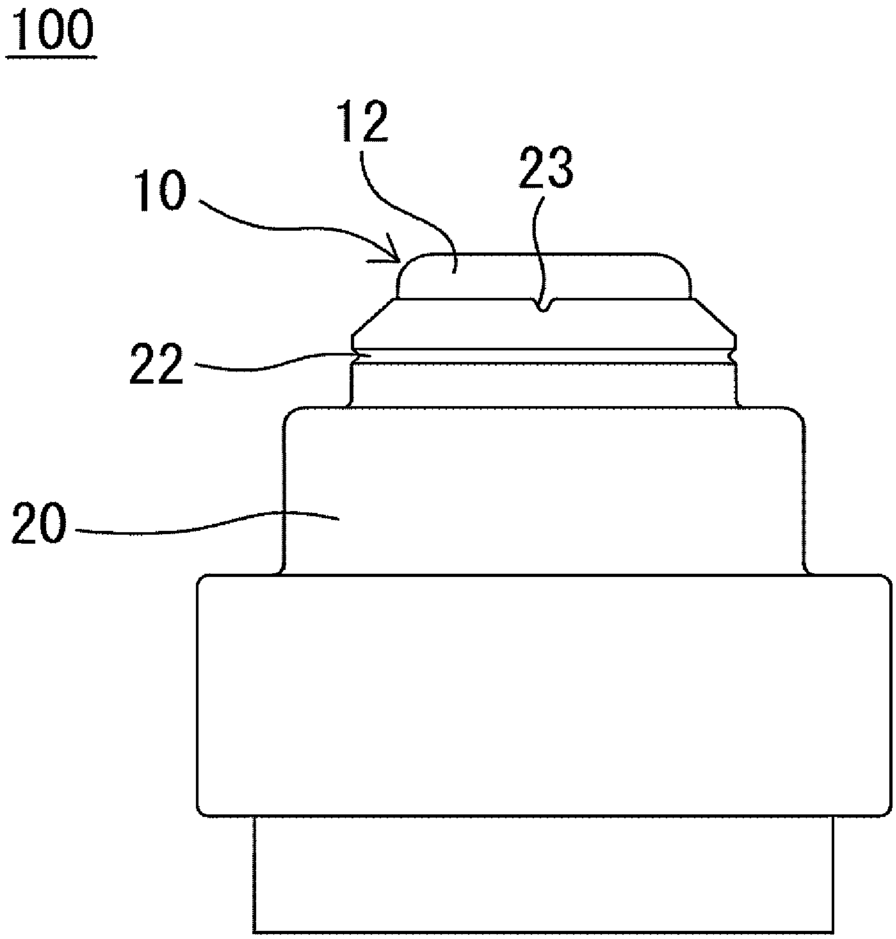
FIG. 1 is a side view illustrating an ignition device according to a first embodiment of the present invention.
Figure 2:
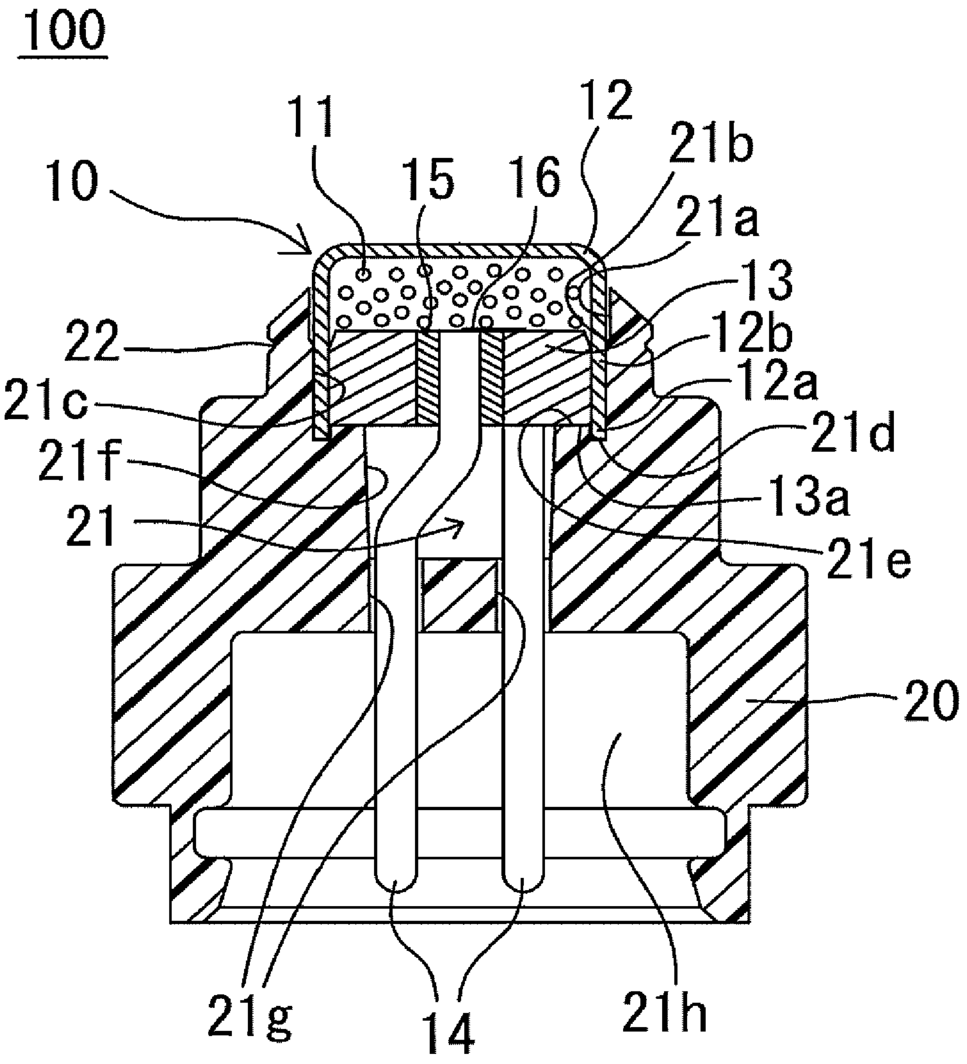
FIG. 2 is a cross-sectional view of the ignition device of FIG. 1.
Figure 3:
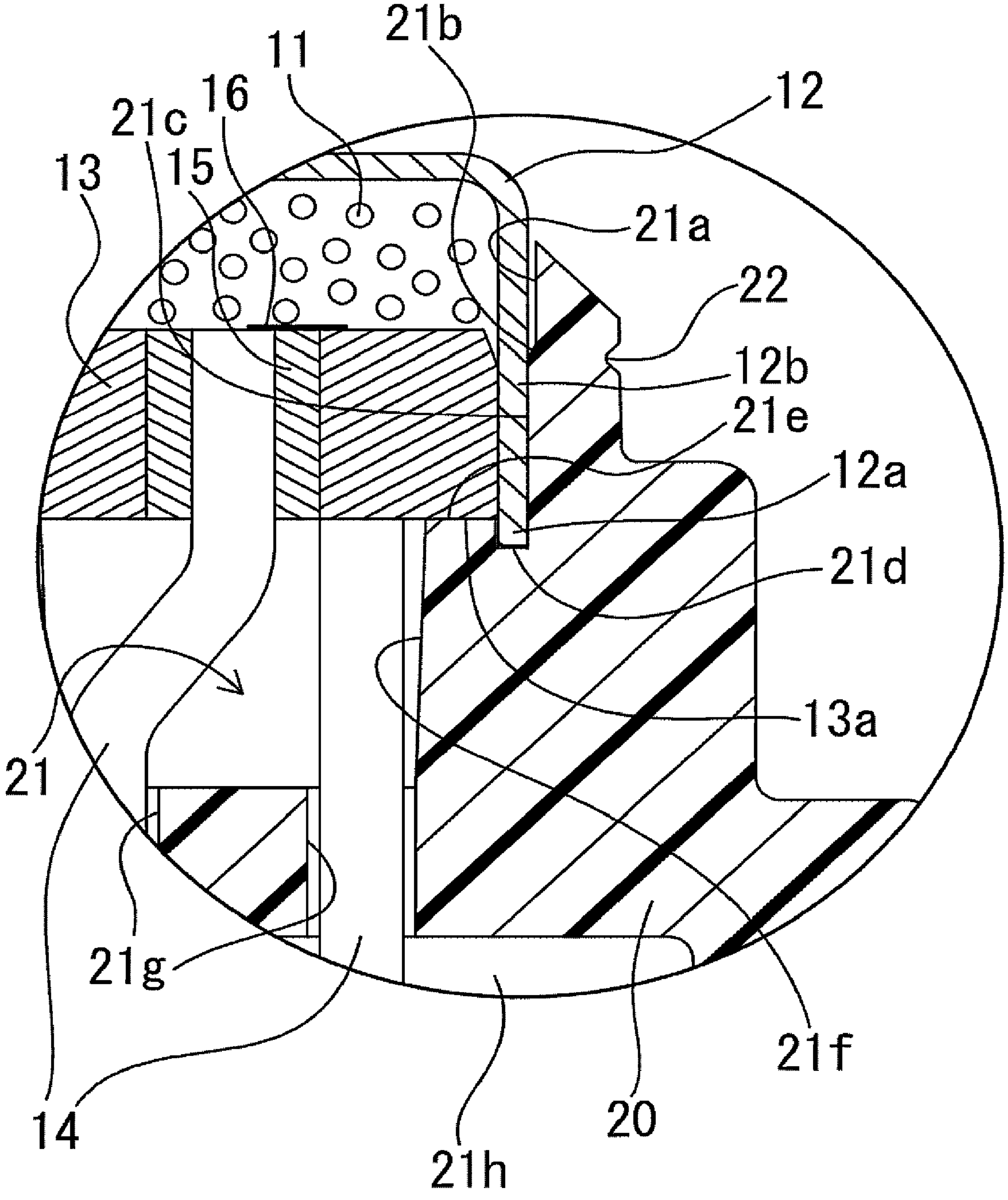
FIG. 3 is a partially enlarged view of the ignition device of FIG. 2.

As illustrated in FIGS. 1 to 3, an ignition device 100 of the present embodiment includes an igniter 10 that accommodates an ignition charge 11 to be ignited by energization, and a holder 20 that includes an insertion port 21*a* for inserting the igniter 10 and is integrated with the igniter 10 by fitting the igniter 10 from the insertion port 21*a*.

The igniter 10 includes a tube body 12 that loads the ignition charge 11, a metal header 13 that seals the ignition charge 11 in the bottomed cylindrical tube body 12 including an opening, a pair of terminal pins 14 protruding from the header 13, an insulator 15 such as glass that insulates between the terminal pins 14, and an bridge wire 16 connected between the terminal pins 14 on the insulator 15 in the tube body 12 and in contact with the ignition charge 11. An end portion 12*a* of the tube body 12 is formed so as to protrude with respect to the header 13. The header 13 includes a surface 13*a* formed on a side opposite to a side of the ignition charge 11.

Note that, in the igniter 10, when the bridge wire 16 is energized via the pair of terminal pins 14, the bridge wire 16 generates Joule heat, the ignition charge 11 is instantly ignited by the heat, and a bottom portion of the tube body 12 is broken by the increase in pressure in the tube body 12 and the header 13. At this time, for example, a conductive wire or the like can be burned off by the flame and the pressure wave of the ejected ignition charge 11, or a drive source for driving a moving body such as a piston can be used.

Furthermore, the igniter 10 is fixed to the holder 20 in a state where the pair of terminal pins 14 is inserted into the bore 21 formed in a substantially central portion of the holder 20 and in a state where a central axis of the igniter 10 itself and a central axis of the holder 20 substantially coincide with each other. Specifically, a cylindrical portion 12*b* of the tube body 12 is press-fitted and fixed to a press-fitting portion 21*c* formed in the bore 21 of the holder 20, whereby the igniter 10 is fixed to the holder 20. Furthermore, the end portion 12*a* of the tube body 12 is fitted into an annular groove 21*d* to be described later formed in the bore 21, and a labyrinth structure is formed by at least an inner wall portion, an end surface portion, and an outer wall portion of the end portion 12*a* and the annular groove 21*d*. Note that this labyrinth structure may also include a portion constituted by an outer wall of the tube body 12, an inner wall of the press-fitting portion 21*c*, the surface 13*a*, a seating surface 21*e* to be described later, a second tapered portion 21*f* to be described later, and a pair of through holes 21*g* to be described later.

The holder 20 is a substantially tubular member in which the bore 21 into which the igniter 10 is inserted and press-fitted and fixed is formed in a central portion. The bore 21 includes the insertion port 21*a*, a first tapered portion 21*b*, the press-fitting portion 21*c*, the annular groove 21*d*, the seating surface 21*e*, the second tapered portion 21*f*, the through hole 21*g*, and a female connector portion 21*h*. Note that the holder 20 is formed as a single body by, for example, injection molding using a flowable resin material.

The insertion port 21*a* has an inner diameter larger than an outer diameter of the tube body 12, and serves as a guide portion when the igniter 10 is inserted. Furthermore, an annular weak portion 22 is formed in an outer peripheral portion of the holder 20 facing the insertion port 21*a*, and a notch portion 23 is formed in an upper end portion of the insertion port 21*a*. The weak portion 22 protects the press-fitting portion 21*c* by serving as a starting point of breakage in a case where a protrusion including the first tapered portion 21*b* and the press-fitting portion 21*c* of the holder 20 receives combustion pressure generated by the activation of the igniter 10 in an outward direction via the tube body 12, and prevents the press-fitting and fixing of the tube body 12 to the press-fitting portion 21*c* from being released.

The first tapered portion 21*b* is formed between the insertion port 21*a* and the press-fitting portion 21*c*, has a tapered shape that reduces in diameter along a press-fitting direction of the tube body 12, and guides the tube body 12 to the press-fitting portion 21*c*. That is, the insertability (assemblability) of the igniter 10 is improved as compared with the case where the first tapered portion 21*b* is not formed.

The press-fitting portion 21*c* is a portion that can hold the igniter 10 and improve airtightness (sealability) inside the igniter 10 by press-fitting and fixing the tube body 12.

The annular groove 21*d* is provided continuously from the press-fitting portion 21*c*, is a portion fitted into the end portion 12*a* of the tube body 12, and forms a labyrinth structure together with the inner wall portion, the end surface portion, and the outer wall portion of the end portion 12*a*. With this labyrinth structure, it is possible not only to maintain the combustion pressure generated by the igniter 10 together with the press-fitting portion 21*c* (to prevent leakage of gas generated at the time of activation of the igniter 10), but also to withstand mechanical vibration in the case of being mounted on a vehicle and impact at the time of activation. Note that a groove depth of the annular groove 21*d* is deeper than a projection margin of the end portion 12*a* of the tube body 12, and the igniter 10 is seated on (in contact with) the seating surface 21*e* via the surface 13*a* of the header 13 on a side opposite to a side on which the ignition charge 11 is disposed. Here, since airtightness (sealability) can be improved by fitting the end portion 12*a* after an adhesive or a sealant is applied to the annular groove 21*d*, the high-pressure igniter 10 can be further used.

The seating surface 21*e* is formed on an inner wall of the bore 21 so as to face the surface 13*a* on a radially inner side of the annular groove 21*d*, and is a surface on which the surface 13*a* of the header 13 of the igniter 10 is seated (in contact).

The second tapered portion 21*f* is formed between the seating surface 21*e* and the pair of through holes 21*g*, and has a tapered shape that reduces in diameter along the press-fitting direction of the tube body 12. The second tapered portion 21*f* has a guide function similar to that of the first tapered portion 21*b*, and has better insertability (assemblability) of the igniter 10 (particularly, the pair of terminal pins 14) than a case where the second tapered portion 21*f* is not formed.

The pair of through holes 21*g* can improve airtightness by regulating a clearance (gap) between the pair of terminal pins 14 and the holder 20, and can restrict positioning and movement of the igniter 10 in a circumferential direction.

The female connector portion 21*h* is a portion formed to hold the pair of terminal pins 14 in a partially exposed state and to connect a male connector (not illustrated) of a harness for electrically connecting the pair of terminal pins 14 to, for example, a control unit (not illustrated).

In a case where the weak portion 22 is damaged at the time of activation, one notch portion 23 is formed to serve as a starting point of the damaged portion, and the shape of the damaged state (scattered object) can be stabilized. Note that it is possible to reduce scattered objects by changing the shape and arrangement positions of the weak portion 22 and the notch portion 23 or providing a plurality of the weak portions 22 and the notch portions 23 as necessary.

In the ignition device 100 configured as described above, an object (for example, a conductive wire) can be broken or melted by the flame generated by the activation of the igniter 10. Furthermore, a pressure wave generated by the activation of the igniter 10 can be used as a driving force for moving a moving body such as a piston. At this time, the ignition device 100 can be used as a drive source of a current breaker having a configuration in which a cutter is attached to a tip of a piston, and a conductive wire or the like is cut off after the movement of the piston.

As described above, according to the present embodiment, it is possible to provide the ignition device 100 capable of securing a necessary function according to a purpose or application.

Furthermore, according to the present embodiment, it is possible to provide the ignition device 100 that can be easily assembled by reducing the number of parts as compared with the related art according to a purpose or application. For example, an insulating cover is not necessary if the igniter 10 and a mating part to which the ignition device 100 is attached are not metal parts and are not contactable. In particular, in the case of use for a current breaker, a structure in which a space is provided between the igniter 10 and a piston moved by a pressure wave generated by the igniter 10, or in the case where the piston is made of resin, the insulating cover is unnecessary. However, in a case where the ignition device is incorporated in a micro gas generator (MGG), an insulating cover is required for a tube body or the like of an igniter that comes into contact with low explosive.

Furthermore, according to the present embodiment, since the holder 20 is made of resin, the material cost can be reduced and the weight can be reduced as compared with the case where the holder 20 is made of metal. Furthermore, since the holder 20 is formed by injection molding alone, a mold structure is simple as compared with a unit integrally molded with the igniter 10, and insert molding as in the related art is unnecessary, so that the molding cycle time can be shortened and the manufacturing cost can be reduced. Furthermore, since the holder 20 is made of resin, the degree of freedom in shape is high as compared with the case of metal, and it is possible to easily change the shape, attach another component, and the like as necessary. Furthermore, since the holder 20 is made of resin, there is no possibility of insulation failure due to metal burrs (caulking and cutting residue) as in the case of metal.

Furthermore, according to the present embodiment, since an assembling process is only for assembling the igniter 10 to the holder 20, the process load can be reduced as compared with the related art. Furthermore, according to the present embodiment, the assembling process is assembly by press-fitting, but since the assembling process is abutting against the seating surface 21*e* and does not include a caulking process or the like, fine process management is unnecessary, manufacturing is easy, and compactness of equipment is possible.

Furthermore, the groove depth of the annular groove 21*d* is deeper than the projection margin of the end portion 12*a* of the tube body 12, and the igniter 10 is seated on the seating surface 21*e* via the surface 13*a* of the header 13. As a result, the assembly accuracy of the igniter 10 and the variation in the dimension of the end portion 12*a* are absorbed, so that the dimensional accuracy after assembly of the ignition device 100 is improved, and the influence due to a product type difference is minimized by sharing the holder 20 (It is possible to provide a variation of the ignition device by changing the igniter 10 to another type of igniter), so that the cost reduction effect can be obtained. For example, it is possible to obtain a reduction in unit price of a component due to mass production of one component of the holder 20, a cost reduction effect due to simplification of assembly equipment, and an assembly cost reduction effect due to no stage change.

Note that a projection margin of the terminal pins 14 from the holder 20 is regulated by the standard of a connector fitted into the female connector portion 21*h*. According to the present embodiment, the standard of the connector can be easily satisfied by seating the igniter 10 on the seating surface 21*e* via the surface 13*a* of the header 13, and since the surface 13*a* is pressed against the seating surface 21*e* in assembly, it is not necessary to control fine positional accuracy, and it is possible to provide relatively high positional accuracy although it is simple.

Furthermore, the weak portion 22 can protect the press-fitting portion 21*c* and the above-described labyrinth structure from the combustion pressure generated in the igniter 10.

Furthermore, in a case where the weak portion 22 is damaged by the notch portion 23 at the time of activation, the notch portion 23 becomes a starting point of the damaged portion, and the shape of the damaged state (scattered object) can be stabilized.

Although the embodiment of the present invention has been described above with reference to the drawings, it should be understood that the specific configuration is not limited to the embodiment. The scope of the present invention is defined not by the description of the above embodiment but by the claims, and includes meanings equivalent to the claims and all modifications within the scope.

REFERENCE SIGNS LIST

10 igniter
11 ignition charge
12 tube body
12*a* end portion
12*b* cylindrical portion
13 header
13*a* surface
14 terminal pin
15 insulator
16 bridge wire
20 holder
21 bore
21*a* insertion port
21*b* first tapered portion
21*c* press-fitting portion
21*d* annular groove
21*e* seating surface
21*f* second tapered portion

21*g* through hole
21*h* female connector portion
22 weak portion
23 notch portion
100 ignition device

The invention claimed is:

1. An ignition device, comprising:
an igniter that accommodates an ignition charge to be ignited by energization; and
a holder that is integrated with the igniter by fitting the igniter into the holder, wherein
the igniter includes:
a tube body containing the ignition charge inside and including an opening,
a header that occludes the opening and seals the ignition charge inside the tube body, and
a pair of terminal pins provided on the header,
an end portion of the tube body forming the opening and protruding with respect to the header, and
the holder includes:
a bore including an insertion port that is formed inside and into which the igniter is inserted and a press-fitting portion into which the tube body is press-fitted via the insertion port, the igniter being fitted into and fixed to the bore by press-fitting the tube body into the press-fitting portion via the insertion port, and
an annular groove that is formed in a part of an inner wall of the bore and into which an end portion of the tube body is fitted, and
a labyrinth structure formed by at least the end portion of the tube body fitted into the annular groove,
wherein an opposite surface of the header on a side opposite to a side on which the ignition charge is disposed is in contact with a surface that is radially inner than the annular groove and is formed on an inner wall of the bore so as to face the opposite surface,
wherein a tapered shape that reduces in diameter in a direction of the press-fitting is formed halfway from the surface that is radially inner than the annular groove and is formed on the inner wall of the bore so as to face the opposite surface to a portion of the bore where the pair of terminal pins is inserted on a side opposite to a side where the tube body is press-fitted.

2. The ignition device according to claim 1, wherein an annular weak portion is formed on an outer peripheral portion of the insertion port.

3. An ignition device, comprising:
an igniter that accommodates an ignition charge to be ignited by energization; and
a holder that is integrated with the igniter by fitting the igniter into the holder, wherein the igniter includes:
a tube body containing the ignition charge inside and including an opening,
a header that occludes the opening and seals the ignition charge inside the tube body, and
a pair of terminal pins provided on the header,
an end portion of the tube body forming the opening and protruding with respect to the header, and
the holder includes:
a bore including an insertion port that is formed inside and into which the igniter is inserted and a press-fitting portion into which the tube body is press-fitted via the insertion port, the igniter being fitted into and fixed to the bore by press-fitting the tube body into the press-fitting portion via the insertion port, and
an annular groove that is formed in a part of an inner wall of the bore and into which an end portion of the tube body is fitted, and
a labyrinth structure formed by at least the end portion of the tube body fitted into the annular groove,
wherein a tapered shape that reduces in diameter along a direction of the press-fitting is formed between the insertion port and the press-fitting portion of the bore.

4. An ignition device, comprising:
an igniter that accommodates an ignition charge to be ignited by energization; and
a holder that is integrated with the igniter by fitting the igniter into the holder, wherein the igniter includes:
a tube body containing the ignition charge inside and including an opening,
a header that occludes the opening and seals the ignition charge inside the tube body, and
a pair of terminal pins provided on the header,
an end portion of the tube body forming the opening and protruding with respect to the header, and
the holder includes:
a bore including an insertion port that is formed inside and into which the igniter is inserted and a press-fitting portion into which the tube body is press-fitted via the insertion port, the igniter being fitted into and fixed to the bore by press-fitting the tube body into the press-fitting portion via the insertion port, and
an annular groove that is formed in a part of an inner wall of the bore and into which an end portion of the tube body is fitted, and
a labyrinth structure formed by at least the end portion of the tube body fitted into the annular groove,
wherein a pair of through holes into which each of the pair of terminal pins is inserted is formed in a portion of the bore into which the pair of terminal pins is inserted on a side opposite to a side where the tube body is press-fitted.

5. The ignition device according to claim 1, wherein the tapered shape is formed between the insertion port and the press-fitting portion of the bore.

6. The ignition device according to claim 2, wherein the tapered shape is formed between the insertion port and the press-fitting portion of the bore.

7. The ignition device according to claim 1, wherein a pair of through holes into which each of the pair of terminal pins is inserted is formed in a portion of the bore into which the pair of terminal pins is inserted on a side opposite to a side where the tube body is press-fitted.

8. The ignition device according to claim 2, wherein a pair of through holes into which each of the pair of terminal pins is inserted is formed in a portion of the bore into which the pair of terminal pins is inserted on a side opposite to a side where the tube body is press-fitted.

9. The ignition device according to claim 3, wherein a pair of through holes into which each of the pair of terminal pins is inserted is formed in a portion of the bore into which the pair of terminal pins is inserted on a side opposite to a side where the tube body is press-fitted.

10. The ignition device according to claim 1, wherein:
the tapered shape is formed between the insertion port and the press-fitting portion of the bore, and
a pair of through holes into which each of the pair of terminal pins is inserted is formed in a portion of the bore into which the pair of terminal pins is inserted on a side opposite to a side where the tube body is press-fitted.

11. The ignition device according to claim 1, wherein:
an annular weak portion is formed on an outer peripheral portion of the insertion port,
the tapered shape is formed between the insertion port and the press-fitting portion of the bore, and
a pair of through holes into which each of the pair of terminal pins is inserted is formed in a portion of the bore into which the pair of terminal pins is inserted on a side opposite to a side where the tube body is press-fitted.

12. The ignition device according to claim 3, wherein an opposite surface of the header on a side opposite to a side on which the ignition charge is disposed is in contact with a surface that is radially inner than the annular groove and is formed on an inner wall of the bore so as to face the opposite surface.

13. The ignition device according to claim 3, wherein an annular weak portion is formed on an outer peripheral portion of the insertion port.

14. The ignition device according to claim 3, wherein:
an opposite surface of the header on a side opposite to a side on which the ignition charge is disposed is in contact with a surface that is radially inner than the annular groove and is formed on an inner wall of the bore so as to face the opposite surface, and
an annular weak portion is formed on an outer peripheral portion of the insertion port.

15. The ignition device according to claim 3, wherein:
an opposite surface of the header on a side opposite to a side on which the ignition charge is disposed is in contact with a surface that is radially inner than the annular groove and is formed on an inner wall of the bore so as to face the opposite surface, and
a pair of through holes into which each of the pair of terminal pins is inserted is formed in a portion of the bore into which the pair of terminal pins is inserted on a side opposite to a side where the tube body is press-fitted.

16. The ignition device according to claim 3, wherein:
an annular weak portion is formed on an outer peripheral portion of the insertion port, and
a pair of through holes into which each of the pair of terminal pins is inserted is formed in a portion of the bore into which the pair of terminal pins is inserted on a side opposite to a side where the tube body is press-fitted.

17. The ignition device according to claim 3, wherein:
an opposite surface of the header on a side opposite to a side on which the ignition charge is disposed is in contact with a surface that is radially inner than the annular groove and is formed on an inner wall of the bore so as to face the opposite surface,
an annular weak portion is formed on an outer peripheral portion of the insertion port, and
a pair of through holes into which each of the pair of terminal pins is inserted is formed in a portion of the bore into which the pair of terminal pins is inserted on a side opposite to a side where the tube body is press-fitted.

18. The ignition device according to claim 4, wherein an opposite surface of the header on a side opposite to a side on which the ignition charge is disposed is in contact with a surface that is radially inner than the annular groove and is formed on an inner wall of the bore so as to face the opposite surface.

19. The ignition device according to claim 4, wherein an annular weak portion is formed on an outer peripheral portion of the insertion port.

20. The ignition device according to claim 4, wherein:
an opposite surface of the header on a side opposite to a side on which the ignition charge is disposed is in contact with a surface that is radially inner than the annular groove and is formed on an inner wall of the bore so as to face the opposite surface, and
an annular weak portion is formed on an outer peripheral portion of the insertion port.

* * * * *